ent Office 3,450,444
Patented June 17, 1969

3,450,444
ANTI-SKID SYSTEM
Robert L. Ballard, Meadowbrook, Pa., assignor to Hurst-Campbell, Inc., Warminster, Pa., a corporation of Pennsylvania
Filed Feb. 9, 1968, Ser. No. 704,318
Int. Cl. B60t *13/68, 8/04, 8/26*
U.S. Cl. 303—21        6 Claims

ABSTRACT OF THE DISCLOSURE

A plurality of electromagnetic sensing devices are respectively associated with the wheels of a vehicle. Each device produces a signal corresponding to the speed of rotation of its associated wheel. The signals from the wheels are individually compared with the signal derived from the fastest turning wheel to produce respective error signals which are applied to respective pressure release valves in the hydraulic brake lines for the slower turning wheels. Each error signal causes the intermittent release of the pressure on the brake to which it is applied for time intervals whose duration is directly proportional to the magnitude of the error signal.

BACKGROUND OF THE INVENTION

There is a demonstrated need for systems which tend to prevent or diminish skidding of vehicles on ice, wet roads, and the like which occurs when the vehicle operator applies the brakes. The skidding action, which the present system is designed to counteract, results in rotation of the wheels at different velocities despite the application of nominally the same braking pressure to all wheels.

BRIEF STATEMENT OF THE INVENTION

I have found that in the type of skidding just mentioned, the skidding may be halted or diminished by adjusting the brake pressure applied to all wheels. In accordance with the invention, a system is provided for detecting the speed of each wheel considering the fastest-turning wheel as the reference non-skidding wheel then reducing intermittently the braking pressure on all wheels turning significantly slower than the fastest wheel for respective time intervals which are directly proportional to the differences between the velocity of the fastest wheel and the velocity of each of the slower turning wheels.

DESCRIPTION OF THE DRAWINGS

FIGS. 4 and 5 are enlarged sectional views of part of the apparatus shown in FIG. 1 in two different operating conditions.

DETAILED DESCRIPTION OF THE SYSTEM

Figure 1:
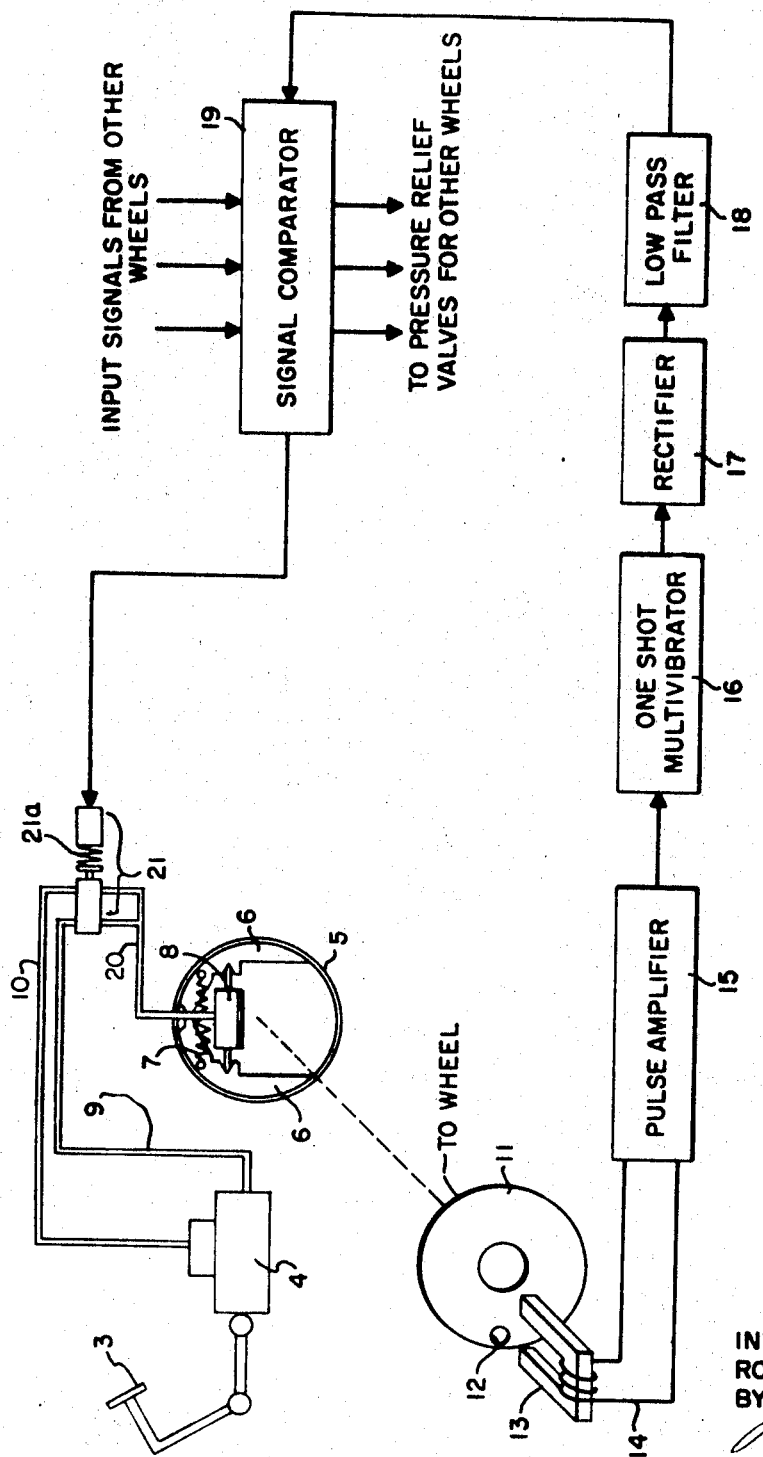
FIG. 1 is a block and schematic diagram of one form of the invention.

FIGURE 1 shows one part of the overall system constructed in accordance with one form of the present invention. Apart from the comparator 19, FIG. 1 illustrates the apparatus for one wheel only, although it should be understood that there would be three other similar arrangements for three other wheels of the vehicle (in the case of a four-wheel vehicle). There is shown the brake drum 5 of one wheel of a vehicle. Also shown are the spring-biased caliper brake shoes 6 which are coupled to the wheel cylinder 8. The wheel cylinder is actuated by the application of hydraulic pressure from the master cylinder 4 through the valve 21 and through hydraulic line 20 when the brake pedal 3 is pressed.

One embodiment of this invention uses disc 11 of magnetic properties attached to the axle of the wheel, having one or more magnetic discontinuities, such as an aperture 12 formed therein. Positioned close to the disc 11 is a permanent magnet 13 around which are wound a number of turns of wire 14 whose ends are connected to the input of a pulse amplifier 15. It will be seen that as the wheel and disc 11 revolve, each time the aperture 12 passes one pole piece of the magnet 13, the flux distribution and intensity of the magnet will change thereby inducing a voltage pulse in the turns 14. This pulse is applied to the amplifier 15 which amplifies it to an amplitude sufficient to initiate the cycle of the one shot multi-vibrator 16. When the amplified pulse is applied to the input of the multi-vibrator, the latter produces alternate positive and negative half cycles. The amplitude and width of the half-cycles are determined by the parameters and values of the multi-vibrator circuit.

The output signal from the multi-vibrator 15 is applied to a rectifier or clipper 17 which extracts only the negative half cycles and applies them to a low pass filter 18. When a train of such negative pulses is applied to this filter, it produces a negative DC output voltage wave which is really an analog signal whose amplitude is directly proportional to the speed of rotation of the associated wheel. This analog signal is applied to one input of a signal comparator 19 whose operation will be explained in detail in connection with FIGURE 2 below. It should be noted that the components shown in FIG. 1 ahead of the comparator are used to derive the velocity analog voltage and can be replaced by equivalent means for producing a tachometer signal.

There are three other inputs to the signal comparator 19 from the three other wheels of the vehicle and their associated apparatus. The comparator 19 is so constructed that it will compare the signal representing the velocity of the fastest wheel (which is considered to be non-skidding, or skidding less than some other wheels) individually with the signal from each other wheel. It will thereupon produce error signals for the wheels which indicate the respective differences between the velocity of the fastest wheel and that of each of the other wheels. The comparator also includes a delay (RC) circuit which sets the minimum threshold of corrective sensitivity. This delay is introduced to permit the system to be insensitive to minor differences in wheel speeds that arise when the vehicle turns a corner, when the tire diameters are unequal, etc. The comparator also produces the error signal pulses at an unvarying repetitive rate but the pulses themselves have a width which varies directly with the difference between the velocity of the fastest wheel and the particular wheel involved.

These error signal pulses are applied to a solenoid-actuated pressure relief valve 21 which is coupled to the hydraulic lines 9, 10, and 20. Line 10 returns to the fluid reservoir of the master cylinder 4. On each actuation of the valve 21, the armature associated with the solenoid 21a is retracted, thereby allowing the hydraulic pressure in line 20, in the wheel cylinder 8 and on the brake shoe to be at least partly reduced by the diversion of some of the fluid back to the reservoir via line 10 (FIG. 5). At the same time, line 9 is blocked off by the valve (FIG. 5) to prevent any effect on the other hydraulic lines going from master cylinder 4 to the other brakes. As a result, the slipping wheel will tend to speed up to match the speed of the faster turning wheels.

If it is assumed that the wheel with which the apparatus shown in FIG. 1 is associated has the lowest rotational velocity of all four wheels, its valve 21 will be actuated by pulses applied thereto whose widths are greater than the width of the error signal pulses applied to the corresponding valves associated with the faster wheels. Consequently, over a period of time, the slowest wheel will have the least total brake pressure applied to it and the intermediate speed wheels will have somewhat more total brake pressure applied to them since their relief pressure pulses will be of shorter duration. The brake pressure applied to the fastest wheel will not be reduced. As a result, the rotational velocities of the wheels other than the fastest wheels will all tend to catch up in speed and thereby diminish or overcome the skidding.

FIGURE 2—DETAILED EXPLANATION

Figure 2:
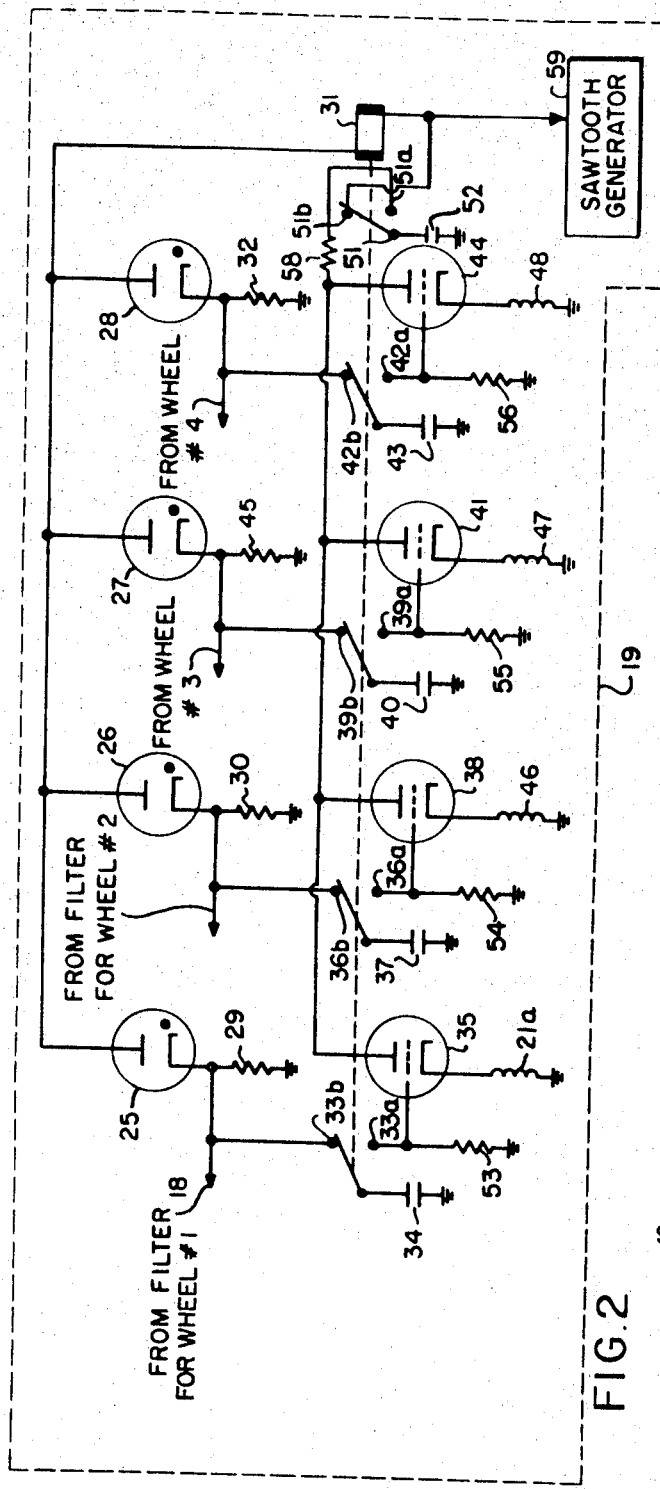
FIG. 2 is a schematic circuit diagram of one of the components shown in FIG. 1.

Referring now to FIGURE 2 there are shown a plurality of gas tubes 25, 26, 27 and 28 having their respective anodes connected through a relay coil 31 to an appropriate source 59 of a positive-polarity sawtooth wave. Connected to the cathodes of each of these tubes are load or limiting resistors 29, 30, 45 and 32, respectively. The various negative input signals applied to the cathodes come from the low pass filter 18 and its counterparts in the systems (not shown) for the three other wheels. Also connected to the sawtooth voltage source 59 is contact 51b and one plate of a large value capacitor 52 whose other plate is connected to ground.

As stated above, there will be four negative input signals to the cathodes of the tubes 25–28. To simplify the explanation, the operation of the circuit will be explained on the assumption that the fastest-turning wheel is connected to the tube 25 and its associated triode 35. The operation of the other diode-triode pairs and their associated circuits is, of course, the same. A positive sawtooth voltage wave, at a frequency of say 15 cycles per second is initially applied to the anodes of all the gas tubes through relay coil 31. Assuming that the ignition potential for the gas diodes is 95 volts and the sawtooth voltage attains +50 v. DC during its rise time, when the analog voltage from filter 18, which may be for example, —45 volts, is applied to the cathode of gas tube 25, it will fire diode 25 and current will flow through it and the load resistor 29 to ground. As soon as gas tube begins to conduct, the relay coil 31 will be energized. Current through the relay coil 31 shifts the arms of the associated cathode relay switches from contact with relay contacts 33b, 36b, 39b, and 42b, into contact with contacts 33a, 36a, 39a, and 42a respectively. As a result, since the analog signal which had been applied to the cathode of tube 25 was simultaneously being applied to the capacitor 34, the stored voltage in capacitor 34 as it discharges through resistor 53 to ground will cause a corresponding negative voltage to be applied to the grid of tube 35. The analog signals which were being applied to the other gas diodes will likewise be stored in respective capacitors 37, 40 and 43 and they will also be applied to their associated triodes.

It should be noted that while the sawtooth voltage was being applied to the anodes of the diodes, it was also being used to charge up capacitor 52. The voltage in the capacitor 52 will be a function of the time in the sawtooth cycle at which the first gas diode conducts. Hence, when the solenoid 31 is energized and the relay arm 57 will move to touch contact 51a, the +50 v. DC stored in the capacitor 52 will thereby be applied to the anodes of the tubes 35, 38, 41 and 44. In other words, the stored DC voltage in capacitor 52 becomes the B+ voltage for these triodes for each sawtooth cycle. The —45 volt analog signal stored in capacitor 34 will be applied to the grid of tube 35 and will keep the triode 35 cut off. Consequently, no current will flow through the solenoid 21a to release the brake pressure against wheel No. 1 the fastest turning (the "non-skidding") wheel. It has thus been seen that since the fastest turning wheel will generate the most negative analog signal, it will, by firing gas tube 25 sooner than any other diode, cause coil 31 to be energized thereby preventing any of the other analog signals from firing the other gas diodes during the same cycle of sawtooth voltage. Thus, the fastest turning wheel determines at what point on the rise time of the sawtooth wave the coil will be energized and hence determines the amplitude of the voltage applied to the anodes of the triodes for comparison with the analog voltages respectively applied to the triode grids from their associated capacitors.

Although the analog signal from the fastest-turning wheel actuates solenoid 31, it is so negative that it keeps its associated triode cut off. On the other hand, the less negative analog signal from a slower wheel, say wheel No. 2, which was stored in the capacitor 37 just before its relay arm switched into contact with contact 36a, is applied to the grid of triode 38. The passage of current through resistor 58 and triode 38 will cause a voltage drop so that the voltage on all of the other plates is reduced somewhat. Since this signal is less negative than that applied to the grid of the tube 35, the triode 38 will begin to conduct if the grid voltage is insufficiently negative relative to the reduced plate voltage to prevent the flow of current through the triode. It will cease conduction when the grid-plate voltage-relation is in sufficient to enable conduction. Conduction of the triode 38 causes the relief-valve solenoid 46 to be energized so that the brake pressure on a slower wheel No. 2 is relieved. If the stored analog signals applied to the grids of the other triodes 41 and 44 at the moment when coil 31 is energized, are more negative than the signal applied to the grid of triode 38 (but are not as negative as the voltage applied to triode 35), they will also cause their associated triodes to conduct for intervals of time which are shorter than the conduction intervals of the triode 38, i.e., which are inversely proportional to the magnitude of their respective analog voltages. If there is a wide variation between the velocities of a badly skidding or locked-up wheel and some other wheel which is skidding only slightly, the triode associated with that other wheel may not conduct at all. This has the effect of relieving the pressure on the wheels in need of relief, while providing a "plateau" of minimum skid under which no corrective action will take place. This will also take care of normal minimal variations in the speeds of the four wheels attributable to tires having different tread depth or inflation, turning of corners, etc.

Figure 3:
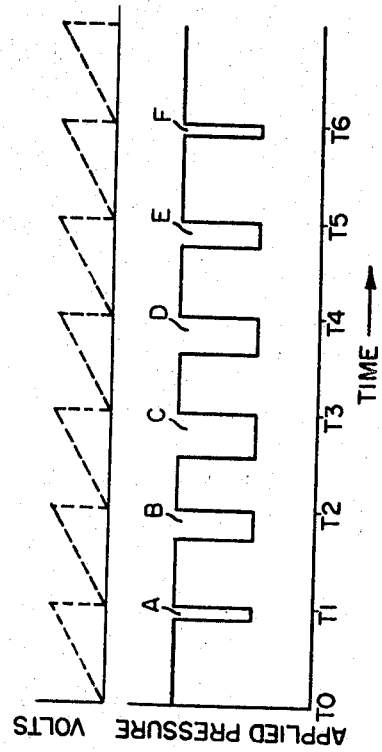
FIG. 3 is a graph depicting the brake pressure release action of the system shown in FIG. 1.

FIGURE 3 illustrates how the brake pressure applied to a particular wheel, say wheel No. 2 in the example explained above, is periodically relieved for varying intervals of time. It sets this out graphically against the occurrence of the sawtooth voltage from generator 59, the sawtooth being shown in a broken line. During the time interval from $T_0$ to $T_1$, the wheel is starting to skid, i.e., to rotate more slowly than one or more of the other wheels. The pressure release interval A shows the beginning of the corrective action produced by the diode 26–triode 38 combination. The width of the interval A is determined by how long it takes for the analog voltage stored in capacitor 37 to discharge through resistor 54 with a value such that the grid of the triode 38 is not negative enough relative to the plate voltage to prevent conduction. As the skid develops on wheel No. 2 during the interval $T_1$–$T_2$, it tends to rotate even more slowly (i.e., to skid more), so its analog signal applied to the grid of triode 38 will be even less negative and the triode will begin to conduct even earlier in the sawtooth cycle. The next pressure relief interval B is therefore longer than interval A. The longest interval C during $T_2$–$T_3$ shows the maximum corrective action as the wheel speed decreases even more. However, once the corrective action due to the diminution of the brake pressure during these intervals has taken effect, the wheel No. 2 will begin to pick up speed during $T_3$–$T_4$. Consequently, it will generate a more negative analog voltage, thereby shortening the relief interval D. Similarly, intervals E and F shows the progressive reduction of the length of the relief intervals as the wheel speed begins to increase, thereby approaching that of the fastest turning wheel.

GENERAL REMARKS

It is evident that other ways of producing the analog voltage from each wheel are also possible. For example, a permanent magnet could be mounted on the edge of a disc which rotates with the wheel. The disc would pass through a winding thereby inducing a pulse therein for each revolution. If a DC tachometer is substituted for components 12 through 18 the analog voltage will be directly derived but this may be a relatively costly alternative. This alternative also has the disadvantage of employing many more moving parts than the predominantly electrical form shown in FIG. 1.

It should be borne in mind that this system is not intended to overcome all types of skidding. For example, it will not be effective when skidding occurs during the time that all four wheels are rendered immobile by the brakes. Nor will it be effective in the case of strictly sideways skidding. The present system is not sensitive to yaw but essentially only to forward motion of the wheels.

Also, the gas diodes and the triodes can naturally be supplanted by their solid state equivalents.

What I claim is:

1. A system for equalizing the rotational velocity of a plurality of rotating members each of which is associated with a braking means, comprising:
   (a) means for sensing differences in the rotational velocities of selected ones of said members with respect to the rotational velocity of the fastest rotating one of said members, and
   (b) means responsive to said differences for adjusting at an unvarying repetition rate, the braking action exerted by the respective braking means associated with said selected members, said adjustment being an intermittent reduction in the braking action exerted by said respective means on their associated members for varying intervals of time, the length of said intervals being a direct function of the magnitude of said sensed differences.

2. The system according to claim 1 wherein said (a) means includes
   (1) a plurality of means for generating a plurality of signals respectively corresponding to the rotation of each of said plurality of rotating members, each of said signals comprising a train of constant amplitude, constant width rectangular electrical pulses,
   (2) a plurality of means to which said plurality of pulses are respectively applied for producing respective corresponding analog signals whose amplitudes are directly proportional to the speeds of their associated rotating members, and
   (3) signal comparison means including a source of a sawtooth wave to which said analog signals are applied for producing error signals respectively indicative of the difference between the velocity of the fastest rotating member and the other rotating members.

3. The system according to claim 1 wherein said rotating members are the wheels of a vehicle and said (a) means includes:
   means respectively associated with each of said wheels for producing an analog signal indicative of the rotational velocity of said wheel when its associated braking means is applied thereto and further wherein said (b) means includes:
   (i) means for comparing the analog signal from the wheel rotating at the highest velocity with the respective analog signals from the other wheels thereby to derive a plurality of error signals, and
   (ii) means coupled to each of said braking means for intermittently reducing the pressure thereof against its associated wheel in response to a respective one of said error signals, the duration of the intervals during which said intermittent reductions occur being a direct function of the amplitude of said one error signal.

4. The system according to claim 3 wherein:
   said (a) means includes:
      (i) magnetic rotating members attached to or part of each of said wheels, each member including a discontinuity formed therein,
      (ii) a plurality of magnets respectively mounted in proximity to said members,
      (iii) a plurality of turns of a conductor wound around each of said magnets and in which voltage pulses are induced when said discontinuities pass said magnets,
      (iv) means responsive to said voltage pulses for producing electrical analog signals and
   wherein:
   said (b) means includes signal comparator means to which said analog signals are applied, said comparator means including:
      (i) a plurality of switching conduction devices to which said analog signals are respectively applied,
      (ii) means for applying a sawtooth wave to all of said (i) devices,
      (iii) a plurality of variable conduction devices,
      (iv) a plurality of switching means respectively connected between one of said switching conduction devices and one of said variable conduction devices,
      (v) a plurality of capacitive means respectively connected to different ones of said (iv) switching means,
      (vi) a signal storage means switchably connected to said sawtooth-applying means and to said plurality of switching means, and
   wherein said (b) means further includes a plurality of brake pressure relief valves connected to respective ones of said conduction devices for actuation thereby when energized by said conduction devices thereby to reduce the pressure of the braking means associated therewith.

5. The system according to claim 4 wherein said means for producing said electrical analog signals includes a one-shot multivibrator which produces a plurality of positive half-cycle rectangular pulses followed immediately by respective negative half-cycle rectangular pulses, a rectifier for extracting substantially only said negative half-cycle pulses, and a low pass filter to which said extracted negative half-cycles are applied which produces a negative DC voltage in response thereto which is an analog of the speed of rotation of the associated wheel.

6. The system according to claim 4 wherein said switching conduction devices are gas tubes and said variable conduction devices are tubes having at least three electrodes.

References Cited

UNITED STATES PATENTS 3,245,213    4/1966    Thompson et al. _____ 303—21
3,260,555    7/1966    Packer _____ 303—21

MILTON BUCHLER, *Primary Examiner.*

J. J. McLAUGHLIN, JR., *Assistant Examiner.*

U.S. Cl. X.R.

188—181; 303—6, 20